United States Patent
Kaneko

(10) Patent No.: US 7,477,823 B2
(45) Date of Patent: Jan. 13, 2009

(54) OPTICAL WAVEGUIDE DEVICE AND FABRICATING METHOD THEREOF

(75) Inventor: Taro Kaneko, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 11/723,504

(22) Filed: Mar. 20, 2007

(65) Prior Publication Data
US 2007/0183731 A1  Aug. 9, 2007

Related U.S. Application Data

(62) Division of application No. 10/387,130, filed on Mar. 13, 2003, now Pat. No. 7,197,220.

(30) Foreign Application Priority Data

Mar. 13, 2002  (JP) ............................. 2002-068967

(51) Int. Cl.
*G02B 6/10* (2006.01)
*B29D 11/00* (2006.01)

(52) U.S. Cl. ....................... 385/129; 385/130; 385/131; 385/132; 438/29; 438/31; 65/385; 65/386; 216/24

(58) Field of Classification Search ................... 385/129
See application file for complete search history.

(56) References Cited

U.S. PATENT DOCUMENTS

| | | | |
|---|---|---|---|
| 4,130,345 A | 12/1978 | Doellner | |
| 4,456,329 A | 6/1984 | Henderson et al. | |
| 4,685,988 A * | 8/1987 | Wagner et al. | 156/250 |
| 5,032,219 A | 7/1991 | Buchmann et al. | |
| 5,103,493 A | 4/1992 | Buchmann et al. | |
| 5,239,600 A | 8/1993 | Handa et al. | |
| 5,438,640 A * | 8/1995 | Sasaoka et al. | 385/43 |
| 5,659,646 A | 8/1997 | Vinchant | |
| 5,825,952 A * | 10/1998 | Kawanishi et al. | 385/47 |
| 5,949,945 A * | 9/1999 | Okano et al. | 385/132 |
| 6,052,397 A | 4/2000 | Jeon | |
| 6,097,864 A | 8/2000 | Kropp | |
| 6,238,943 B1 | 5/2001 | Kobayashi et al. | |
| 6,266,468 B1 | 7/2001 | Rickman | |
| 6,438,279 B1 | 8/2002 | Craighead | |
| 6,556,759 B2 | 4/2003 | Roberts | |
| 6,788,848 B2 | 9/2004 | Yoneda | |
| 2002/0044742 A1 | 4/2002 | Yoneda | |

FOREIGN PATENT DOCUMENTS

| | | |
|---|---|---|
| JP | 03-0304490 | 2/1991 |
| JP | 11-023873 | 1/1999 |
| JP | 2000-275450 | 10/2000 |
| JP | 2001-221925 | 8/2001 |

* cited by examiner

*Primary Examiner*—Frank G Font
*Assistant Examiner*—Ryan Lepisto
(74) *Attorney, Agent, or Firm*—Foley & Lardner LLP

(57) ABSTRACT

Optical waveguide device has waveguide strip-shaped in the depth direction of the drawing and protruding from peripheral portion. A core (not illustrated) is disposed inside waveguide. Wall to be cut is integrated with waveguide to form one core layer. No unevenness occurs in a cutting line of wall indicated with broken line. Accordingly, high-precision cutting is enabled by cutting wall along the cutting line.

18 Claims, 16 Drawing Sheets

(EMBEDDED WAVEGUIDE)

(RIDGE WAVEGUIDE)

(STRIP LOADED WAVEGUIDE)

OPTICAL WAVEGUIDE DEVICE AND FABRICATING METHOD THEREOF

CROSS-REFERENCE TO RELATED PATENT APPLICATIONS

This application is a division of application Ser. No. 10/387,130, filed Mar. 13, 2003, now pending, and based on Japanese Patent Application No. 2002-068967, filed Mar. 13, 2002, by Taro Kaneko, which is incorporated herein by reference in its entirety. This application claims only subject matter disclosed in the parent application and therefore presents no new matter.

BACKGROUND OF THE INVENTION

1. Field of the Invention

The present invention relates to an optical waveguide device such as an arrayed waveguide grating (AWG), and a fabricating method thereof, and in particular, to an optical waveguide device and a fabricating method thereof suitable for cutting or processing a portion formed with a light guiding core.

2. Description of the Related Art

With the remarkable development of communications technology such as the Internet, it has rapidly been required that optical waveguide devices be enhanced in function, and hybrid packaging of optical waveguide devices has also been actively performed. Such hybrid packaging requires high-precision cutting of the device at a predetermined portion for joining the optical waveguide devices, or each kind of processing such as provision of a groove or space in the device for incorporating other components. Also, even when such hybridization is not performed, components such as optical fiber arrays are often joined to the end face of the optical waveguide device for light input/output. To this end, cutting of the end face or predetermined portion of these optical waveguide devices cut out from the wafer is performed.

However, when such cutting of the optical waveguide devices is performed, chippings and recesses occur in the end face of the optical waveguide in the event that its upper surface is uneven. Consequently, the optical connection with a component arranged in contact with the end face is not satisfactorily performed. Prior to the examination of the shape of the cut surface, the occurrence of unevenness in the upper surface of the optical waveguide device is explained.

FIG. 1 illustrates an example of a production process when a core and a cladding are formed over a substrate. First, as illustrated in FIG. 1A, substrate 1 such as silicon (Si) is prepared. Then, as illustrated in FIG. 1B, substrate 1 is coated on one side with lower cladding layer 2. Further, as illustrated in FIG. 1C, lower cladding layer 2 is coated with core layer 3.

FIG. 1D illustrates a processing step for removing an unwanted portion of core layer 3. Core layer 3 is applied with photoresist 4, covered with photo-mask 5 and irradiated with ultraviolet light 6. Pattern 7 matched with a portion which remains as a core is formed in photo-mask 5, so that in photoresist 4 only an area where the portion remains as the core, or an area except the portion which remains as the core is irradiated with the ultraviolet light. FIG. 1E illustrates a state subsequent to the development of photoresist 4. Photoresist 4A is only the portion which remains as the core.

FIG. 1F illustrates a state subsequent to etching. The etching removes a portion of core layer 3 on which photoresist 4A is absent, so that only required core portion 3A remains. FIG. 1G illustrates a state subsequent to the removal of photoresist 4A by a chemical.

Thereafter, as illustrated in FIG. 1H, lower cladding layer 2 and core portion 3A are coated with upper cladding layer 8. In this coating process, since the portion to be the cladding is deposited from the top of this diagram, upper cladding layer 8 is higher on the portion corresponding to protruding core portion 3A than on the other portion thereof in FIG. 1G.

FIGS. 2-4 illustrate some of cross-sectional structures of optical waveguide devices. In these figures, the same characters as FIG. 1 denote like portions. FIG. 2 illustrates an optical waveguide device produced by the production process explained in FIG. 1, and which is called the embedded waveguide.

FIG. 3 illustrates an optical waveguide device called the ridge waveguide, in which portion 21A of core layer 21 formed on cladding layer 2 formed on substrate 1 protrudes. Portion 21A serves as the core. FIG. 4 illustrates an optical waveguide device called the strip loaded waveguide, in which core layer 22 formed on cladding layer 2 is partially loaded with core 23.

Although there are some other different production processes for optical waveguide devices, cores 3A, 21A, and 23 of the optical waveguide devices illustrated in FIGS. 2-4 are formed even higher than the periphery. Therefore, forming upper cladding layer 8 in the following step makes the portion on cores 3A, 21A, and 23 higher than the other portion.

The prior-art processing will hereinafter be explained concerning the cutting of such optical waveguide devices.

FIGS. 5 and 6 illustrate an example of forming a groove by cutting halfway through a substrate of an optical waveguide device. This proposal shown in Japanese unexamined patent publication No. 11-23873 processes the groove in the optical waveguide device. As illustrated in FIG. 5, the 1st step forms groove 16 by etching in waveguide 15 made of core 12 and claddings 13 and 14 formed on substrate 11. As illustrated in FIG. 6, the 2nd step also forms groove 16 in substrate 11 by mechanical cutting with narrower blade 17 than groove 16.

This proposal forms the groove against hard waveguide 15 by etching in the 1st step. Accordingly, damage to blade 17 is reduced. Also, since groove 16 is formed in waveguide 15 by etching, the chipping of waveguide 15 is reduced. Also, the positional control of blade 17 is disclosed in Japanese unexamined patent publication No. 2000-275450.

Now, the core and claddings are present in the waveguide on top of the optical waveguide device, and the unevenness is present between the core and claddings and the upper surface portion of the substrate being positionally matched thereto, as explained above. Cutting such an uneven portion or groove therein causes deformation in the shape of the processed end face, and degradation in the optical characteristics.

FIG. 7 illustrates a near end of an optical waveguide device, while FIG. 8 is a top view of the optical waveguide illustrated in FIG. 7. Optical waveguide device 31 shown in these figures is made of substrate 32 and waveguide 33, wherein waveguide 33 protrudes upwards. Optical waveguide device 31 is cut in a slightly inner portion from one end along broken line 35 perpendicular to the top surface of the substrate (see FIG. 8). Cutting techniques by reactive ion etching and by a blade are examined.

FIG. 9 illustrates an outline of a production process by reactive ion etching. FIG. 9A illustrates a side view of optical waveguide device 31 prior to processing. Optical waveguide device 31 is applied with photoresist 41 (FIG. 9B), covered with photo-mask 42, and irradiated only on broken line 35 with ultraviolet light 43 (FIG. 9C) for pattern transfer. Then by the development of photoresist 41, photoresist 41 is selectively removed with respect to the UV-irradiated line.

Thereafter, a gas is changed by the application of high frequency power into a plasma state to produce accelerated plus ions to collide with the optical waveguide device, and thereby cause reactive ion etching (RIE). The introduced gas uses a compound containing a halogen such as fluorine or chlorine to be reactive with the substrate material and tend to produce a volatile substance. Accordingly, the gas and substance in the cut location react to produce a volatile substance, while the processing progresses.

FIG. 10 illustrates a manner of cutting an optical waveguide device with a blade. In this case, optical waveguide device 31 is cut along broken line 35 (see FIG. 8) with disk-shaped blade 51 pressed thereagainst.

FIGS. 11A and 11B illustrate a change in the end face subsequent to reactive ion etching. Waveguide 33 protruding from substrate 32 is recessed (recess 36) from the other cut surface. This recess 36 is caused by thinner photoresist 41 on protruding waveguide 33 than on the other top surface as illustrated in FIG. 9C. That is, since protruding waveguide 33 tends to be etched more than the other portion, the cut portion of protruding waveguide 33 is recessed.

On the other hand, the cutting of the optical waveguide device by blade 51 (shown in FIG. 10) or dicing saw tends not only to damage the blade at the relatively hard protruding core portion, but also to cause chipping in waveguide 33, as pointed out in Japanese unexamined patent publication No. 11-23873.

FIG. 12 illustrates an example of such chipping in a waveguide. Chipping 37 occurs at the end of protruding waveguide 33 from substrate 32 in FIG. 12 corresponding with FIG. 11A. Also, in the optical waveguide device where the core forms the protrusion while the cladding forms the recess as illustrated FIGS. 3 and 4, local stress concentration tends to selectively cause chipping in the core or cladding. Blade deformation by such chipping and protrusion causes a defect in the cut end face.

As explained above, in the case that the upper surface of the optical waveguide device is uneven, the prior art has difficulty in high-precision cutting thereof. This is also true for the case of the processing of a groove. Consequently, the problem exists of being unable to satisfactorily bond or incorporate other components to be matched with the processed end face and groove, and degrading the optical characteristics of hybrid-packaged components or components joined to other components at the end face.

SUMMARY OF THE INVENTION

Thus, an object of the present invention is to provide an optical waveguide device whose core portion can be cut with high precision, or a method of fabricating an optical waveguide device capable of being thus cut.

The foregoing and other objects of the present invention are achieved by the following:

An optical waveguide device comprises a core for propagating light, and a member to be cut at a predetermined angle to the core, the member being arranged to cross the core at the angle, and a height of the member being constant at a position where the member crosses the core.

An optical waveguide device comprises a core for propagating light; and a member having a predetermined width to be cut in its lengthwise direction, the member being arranged to cross the core at a predetermined angle, and a height of the member being varied uniformly at a position where the member crosses the core.

An optical waveguide device comprises a core for propagating light, and a member having a predetermined width to be cut in its lengthwise direction, the member being connected with the core at a predetermined angle to provide a T-shaped pattern, and a height of the member being constant at a position where the member is connected with the core.

An optical waveguide device comprises a core for propagating light, and a member having a predetermined width to be cut in its lengthwise direction, the member being connected with the core at a predetermined angle to provide a T-shaped pattern, and a height of the member being varied uniformly at a position where the member is connected with the core.

In the above optical waveguide devices, the core is the same in material as the member.

In the above optical waveguide devices, the core is integrated with the member.

In the above optical waveguide devices, the core and the member are covered with a cladding.

In the above optical waveguide devices, the core and the member are covered at least on a side of a substrate with a cladding.

In the above optical waveguide devices, the core and the member are formed on a core layer which is the same in material as the core.

In the above optical waveguide devices, the core includes a plurality of cores which are arranged in parallel with a predetermined interval; and the member is connected in common with the plurality of cores.

In the above optical waveguide devices, the core is of a tapered shape at an end portion thereof, with which the member is in contact.

In the above optical waveguide devices, the tapered shape of the core is larger in width, as a distance of the core is smaller relative to the member.

In the above optical waveguide devices, the tapered shape of the core is smaller in width, as a distance of the core is smaller relative to the member.

In the above optical waveguide devices, the member is arranged to cross the core at an angle of 90°.

In the above optical waveguide devices, the member is arranged to cross the core at an angle of 80° to 100°.

According to the above optical waveguide devices of the present invention, since the member with no unevenness is disposed and cut at the end of the core through which light propagates, no local stress due to unevenness occurs during cutting, and high-precision cutting is enabled, thereby ensuring satisfactory optical coupling between this cut surface and another optical device opposite thereto or in contact therewith.

Also, since the core and the member to be cut are integrated with each other, the high-quality optical waveguide device can not only be fabricated inexpensively, but optical loss due to reflection at a connection portion can also be suppressed.

Further, since the taper is formed at the tip of the core in contact with the member to be cut, satisfactory optical coupling is enabled between this cut surface and another optical device opposite thereto or in contact therewith.

Also, since the member to be cut is arranged to cross said core at an angle of 80° to 100°, light reflected at the end face of the core can be prevented from returning thereto.

A method of fabricating an optical waveguide device, comprises the steps of: forming a cladding on a substrate; forming a core layer of a flat plate shape on the cladding; removing the core layer in a predetermined shape at a predetermined depth to provide a member having a predetermined width to be cut in its lengthwise direction, the member being arranged to cross a core for propagating light at a predetermined angle, and a height of the member being constant at a position where the member crosses the core, while the predetermined shape excluding the core and the member; and cutting the member in the lengthwise direction.

A method of fabricating an optical waveguide device, comprises the steps of: forming a cladding on a substrate; forming a core layer of a flat plate shape on the cladding; removing the core layer in a predetermined shape at a predetermined depth to provide a member having a predetermined width to be cut in its lengthwise direction, the member being arranged to cross a core for propagating light at a predetermined angle, and a height of the member being varied uniformly at a position where the member crosses the core, while the predetermined shape excluding the core and the member; and cutting the member in the lengthwise direction.

A method of fabricating an optical waveguide device, comprises the steps of: forming a cladding on a substrate; forming a core layer of a flat plate shape on the cladding; removing the core layer in a predetermined shape at a predetermined depth to provide a member having a predetermined width to be cut in its lengthwise direction, the member being connected with a core for propagating light at a predetermined angle to provide a T-shaped pattern, and a height of the member being constant at a position where the member is connected with the core, while the predetermined shape excluding the core and the member; and cutting the member in the lengthwise direction.

A method of fabricating an optical waveguide device, comprises the steps of: forming a cladding on a substrate; forming a core layer of a flat plate shape on the cladding; removing the core layer in a predetermined shape at a predetermined depth to provide a member having a predetermined width to be cut in its lengthwise direction, the member being connected with a core for propagating light at a predetermined angle to provide a T-shaped pattern, and a height of the member being varied uniformly at a position where the member is connected with the core, while the predetermined shape excluding the core and the member; and cutting the member in the lengthwise direction.

A method of fabricating an optical waveguide device, comprises the steps of: forming a cladding on a substrate; forming a first core layer of a flat plate shape on the cladding; forming a second core layer on the first core layer; removing the second core layer in a predetermined shape at a predetermined depth to provide a member having a predetermined width to be cut in its lengthwise direction, the member being arranged to cross a core for propagating light at a predetermined angle, and a height of the member being constant at a position where the member crosses the core, while the predetermined shape excluding the core and the member; and cutting the member in the lengthwise direction.

A method of fabricating an optical waveguide device, comprises the steps of: forming a cladding on a substrate; forming a first core layer of a flat plate shape on the cladding; forming a second core layer on the first core layer; removing the second core layer in a predetermined shape at a predetermined depth to provide a member having a predetermined width to be cut in its lengthwise direction, the member being arranged to cross a core for propagating light at a predetermined angle, and a height of the member being varied uniformly at a position where the member crosses the core, while the predetermined shape excluding the core and the member; and cutting the member in the lengthwise direction.

A method of fabricating an optical waveguide device, comprises the steps of: forming a cladding on a substrate; forming a first core layer of a flat plate shape on the cladding; forming a second core layer on the first core layer; removing the second core layer in a predetermined shape at a predeter-
mined depth to provide a member having a predetermined width to be cut in its lengthwise direction, the member being connected with a core for propagating light at a predetermined angle to provide a T-shaped pattern, and a height of the member being constant at a position where the member is connected with the core, while the predetermined shape excluding the core and the member; and cutting the member in the lengthwise direction.

A method of fabricating an optical waveguide device, comprises the steps of: forming a cladding on a substrate; forming a first core layer of a flat plate shape on the cladding; forming a second core layer on the first core layer; removing the second core layer in a predetermined shape at a predetermined depth to provide a member having a predetermined width to be cut in its lengthwise direction, the member being connected with a core for propagating light at a predetermined angle to provide a T-shaped pattern, and a height of the member being varied uniformly at a position where the member is connected with the core, while the predetermined shape excluding the core and the member; and cutting the member in the lengthwise direction.

In the above methods of fabricating an optical waveguide device, the cutting step is carried out to cut the member by means of reactive ion etching.

In the above methods of fabricating an optical waveguide device, the cutting step is carried out to cut the member by use of a dicing saw.

According to the above methods of fabricating an optical waveguide device of the present invention, since subsequent to forming of the core layer of a flat plate shape on the substrate, the portion excluding the core and the member is removed, no unevenness exists in the cutting direction of the member, thereby enabling high-precision cutting thereof.

BRIEF DESCRIPTION OF THE DRAWINGS

Preferred embodiments of the present invention will hereinafter be described with reference to the accompanying drawings, wherein.

DETAILED DESCRIPTION OF THE PREFERRED EMBODIMENTS

Figure 7:
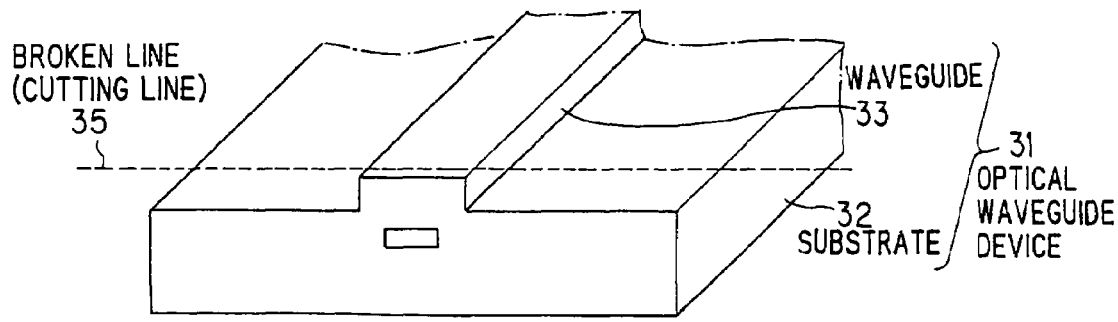
FIG. 7 is a perspective view of an essential portion illustrating a near end of an optical waveguide device.
Figure 13:
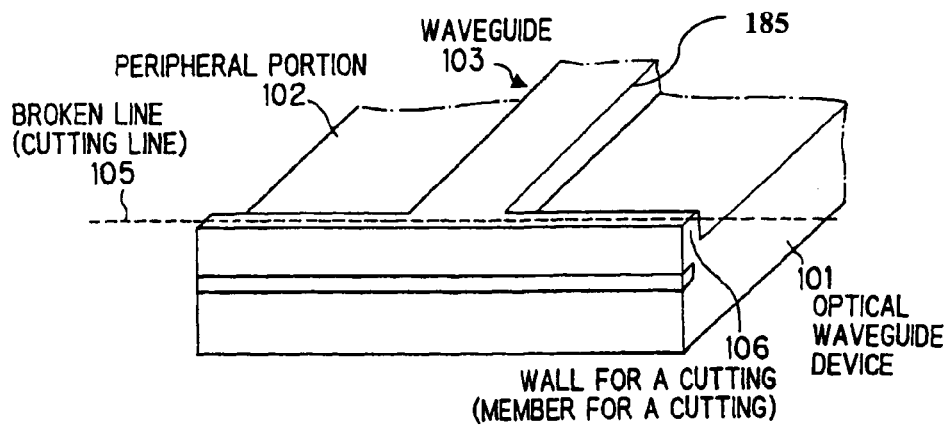
FIG. 13 is a perspective view of an essential portion prior to processing of an optical waveguide device constituting an optical waveguide device in one embodiment of the present invention.

FIG. 13 illustrates a state prior to cutting of an optical waveguide device in one example of the present invention, and corresponds to FIG. 7. Optical waveguide device 101 has waveguide 103 strip-shaped in the depth direction of the drawing and protruding from peripheral portion 102, as in FIG. 7. A core (not illustrated) is disposed inside waveguide 103 or in a lower portion thereof. A different aspect from FIG. 7 is that there is formed wall to be cut (member to be cut) 106 with the same height as waveguide 103 as indicated with broken line (cutting line) 105.

Figure 8:
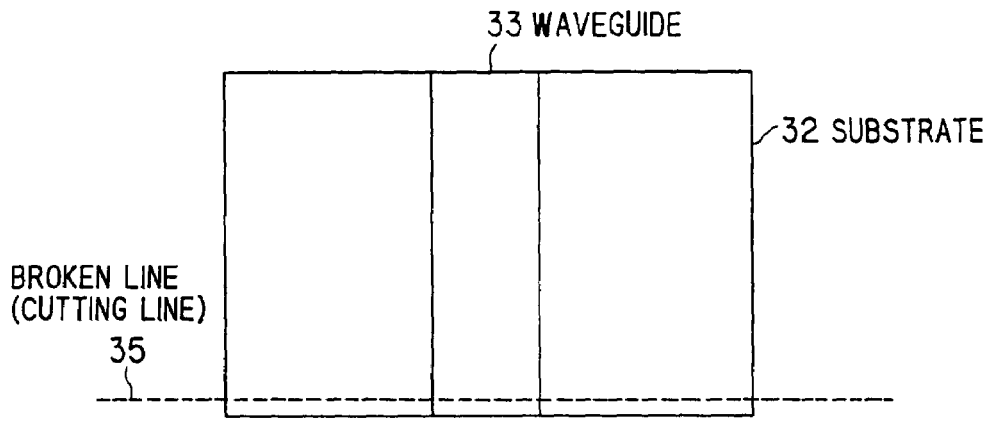
FIG. 8 is a top view of the optical waveguide illustrated in FIG. 7.
Figure 9A:
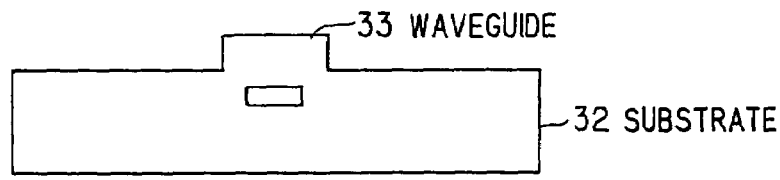
FIGS. 9A-9C are an explanatory diagram illustrating an outline of a fabricating process by reactive ion etching.
Figure 9B:
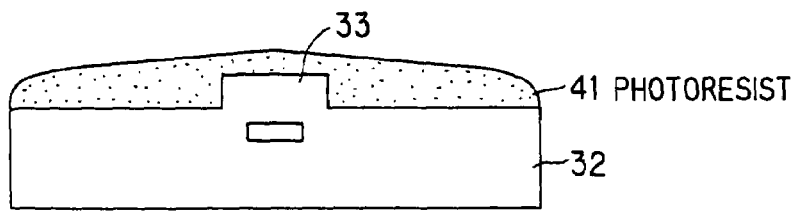
Figure 9C:
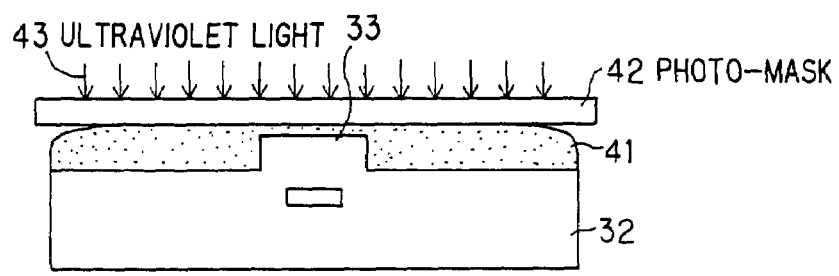
Figure 10:
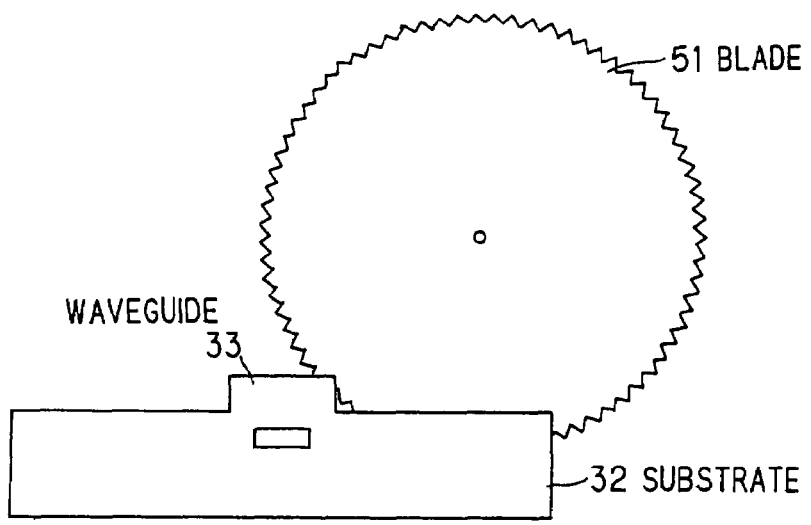
FIG. 10 is an explanatory diagram illustrating a manner of cutting an optical waveguide device with a blade.
Figure 11A:
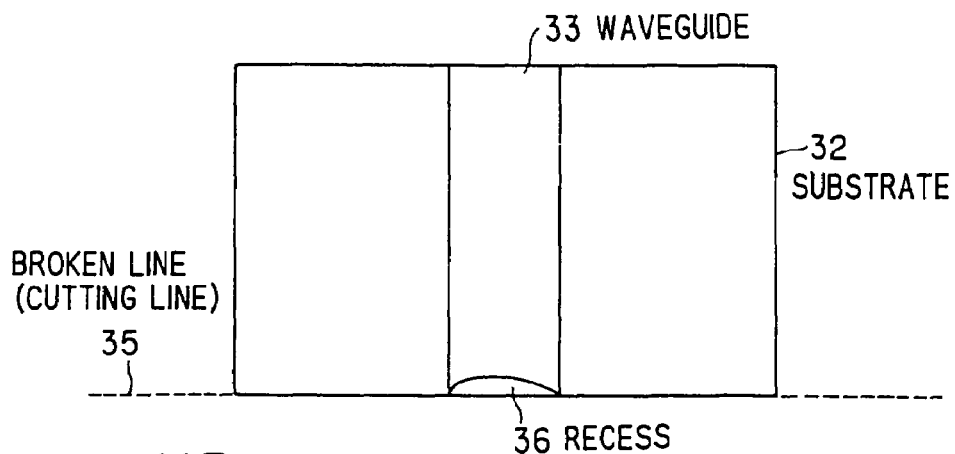
FIGS. 11A and 11B are top and perspective views of a waveguide illustrating a change in an end face subsequent to reactive ion etching.
Figure 11B:
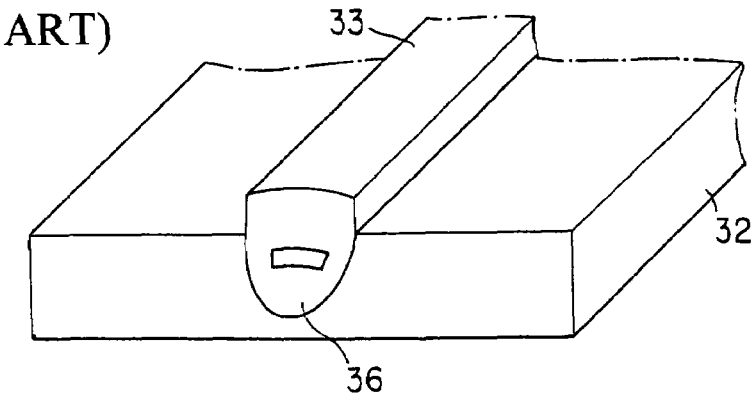
Figure 12:
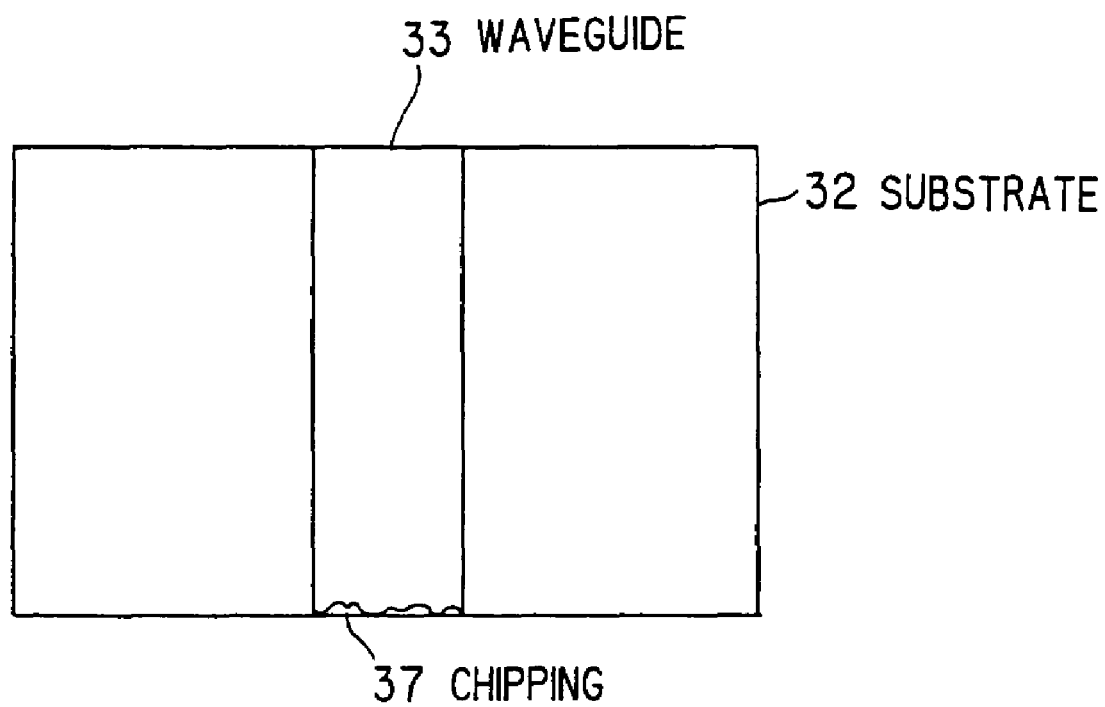
FIG. 12 is a top view when an optical waveguide device is cut with a blade or dicing saw.
Figure 14:
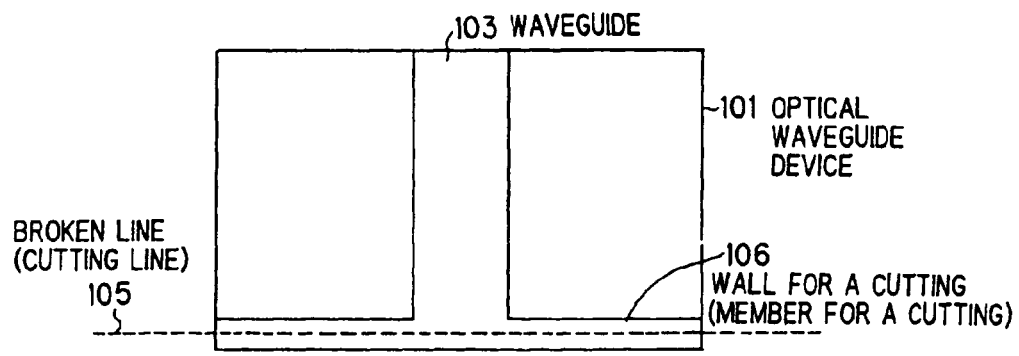
FIG. 14 is a top view of an optical waveguide device constituting the optical waveguide device of the present embodiment.

FIG. 14 is a top view of a waveguide of an optical waveguide device of the present invention, and corresponds to FIG. 8. As also understood from FIG. 14, the cutting line indicated with broken line 105 is along a top of wall 106 to be cut. Since wall 106 to be cut has the same height as protruding strip-shaped waveguide 103, these portions are in a T shape as a whole.

Figure 15:
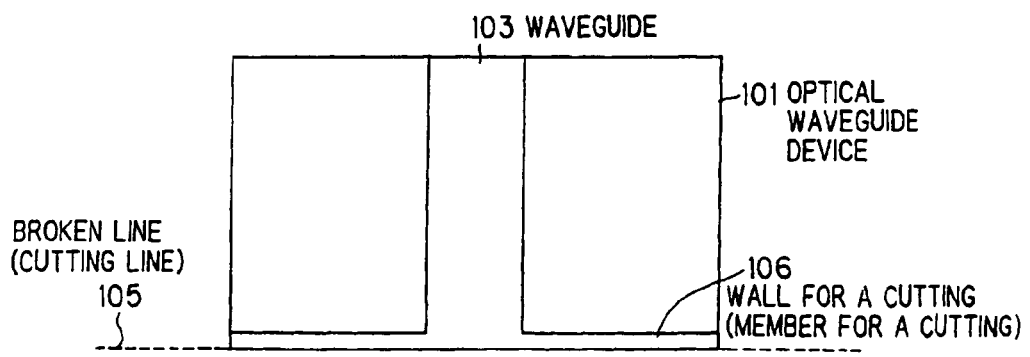
FIG. 15 is a top view illustrating an optical waveguide device subsequent to reactive ion etching in the present embodiment.

FIG. 15 illustrates an optical waveguide device subsequent to reactive ion etching. The cutting line indicated with broken line 105 in FIG. 14 has the same height in the entire area. Accordingly, a resist applied prior to reactive ion etching has a uniform thickness at the top of wall 106 to be cut. Therefore, cutting by reactive ion etching can be performed without causing a recess as indicated with broken line 105 of FIG. 14.

Figure 16:
FIG. 16 is a perspective view of an essential portion illustrating a substrate of the optical waveguide device of the present embodiment.
Figure 17:
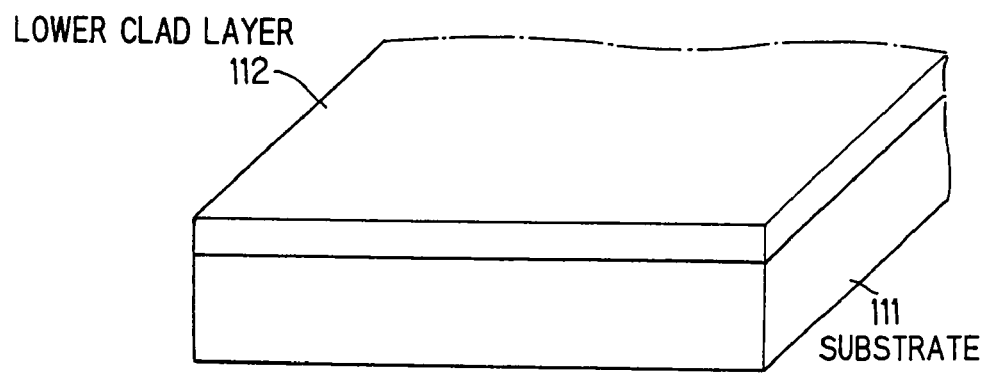
FIG. 17 is a perspective view of an essential portion illustrating a state where the substrate of the optical waveguide device of the present embodiment is coated with a lower cladding layer.
Figure 18:
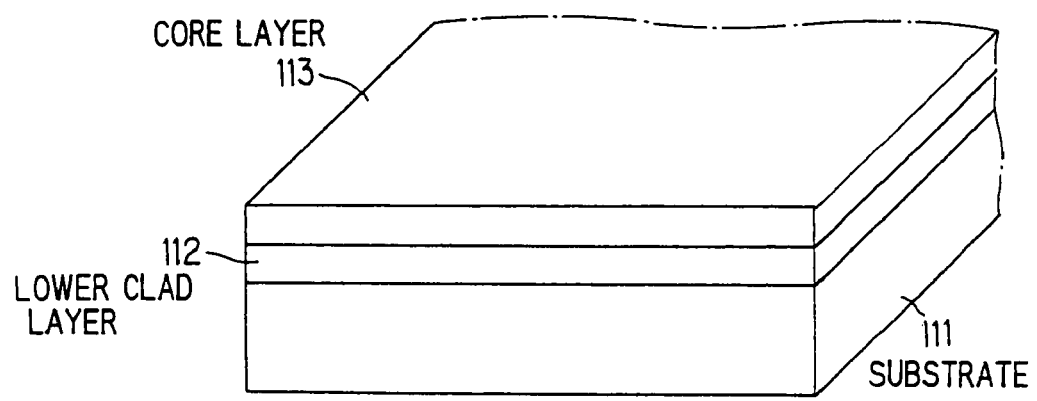
FIG. 18 is a perspective view of an essential portion illustrating a state where the lower cladding layer is uniformly formed with a core layer in the present embodiment.

FIGS. 16-18 illustrate each essential step of a process of producing such an optical waveguide device. FIG. 16 illustrates substrate 111 of this optical waveguide device. Substrate 111 uses silicon (Si). FIG. 17 illustrates a state where substrate 111 is coated with lower cladding layer 112. FIG. 18 illustrates a state where lower cladding layer 112 is uniformly formed with core layer 113. So far, the process is exactly the same as the prior-art process of producing an optical waveguide device.

Figure 1A:
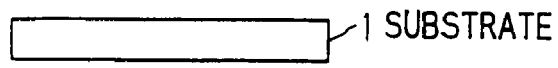
FIGS. 1A-1H are an explanatory step diagram illustrating an example of a production process when a core and a cladding are formed over a substrate.
Figure 1B:
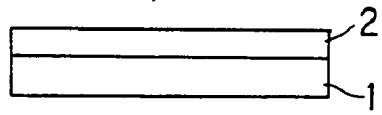
Figure 1C:
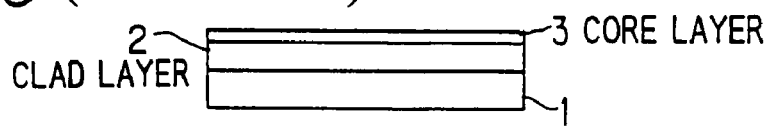
Figure 1D:
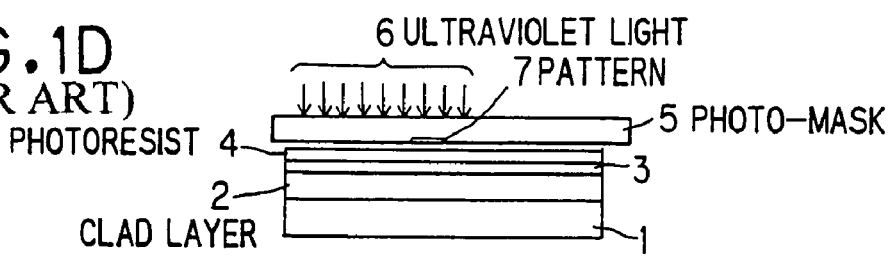
Figure 1E:
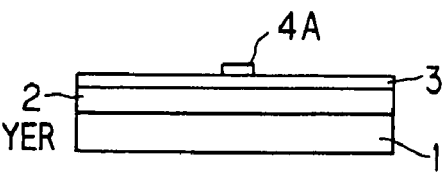
Figure 1F:
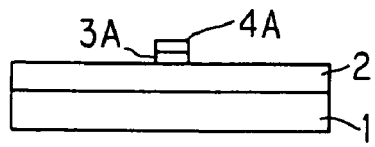
Figure 1G:
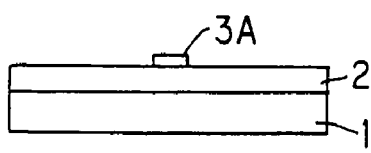
Figure 1H:
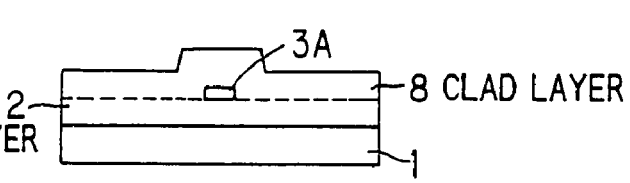
Figure 2:
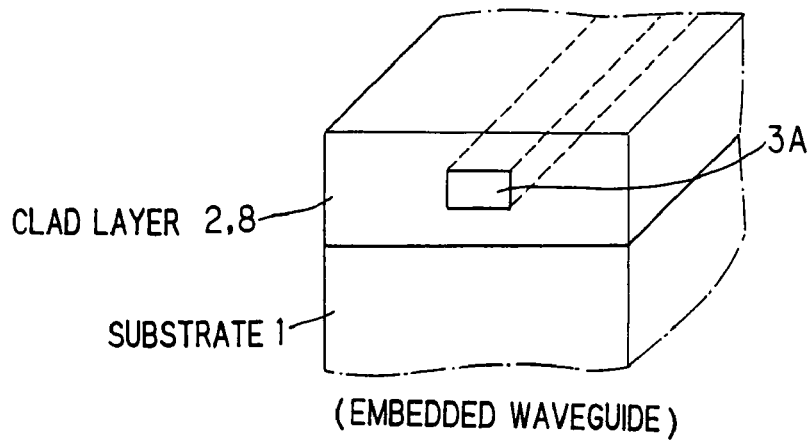
FIG. 2 is an explanatory diagram illustrating a cross-sectional structure of an embedded waveguide.
Figure 3:
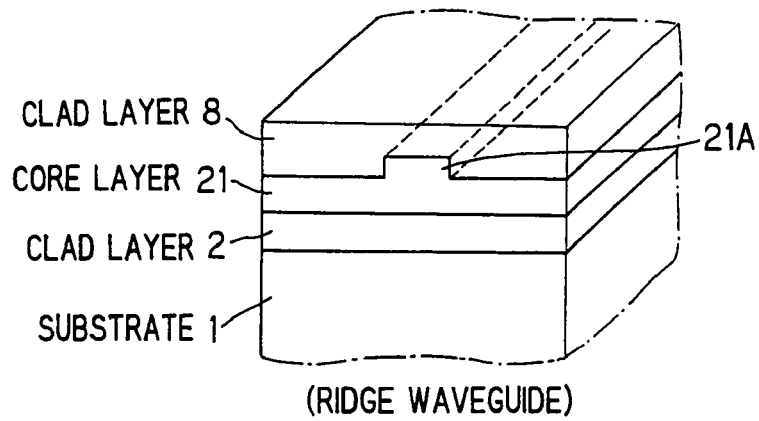
FIG. 3 is an explanatory diagram illustrating a cross-sectional structure of a ridge waveguide.
Figure 4:
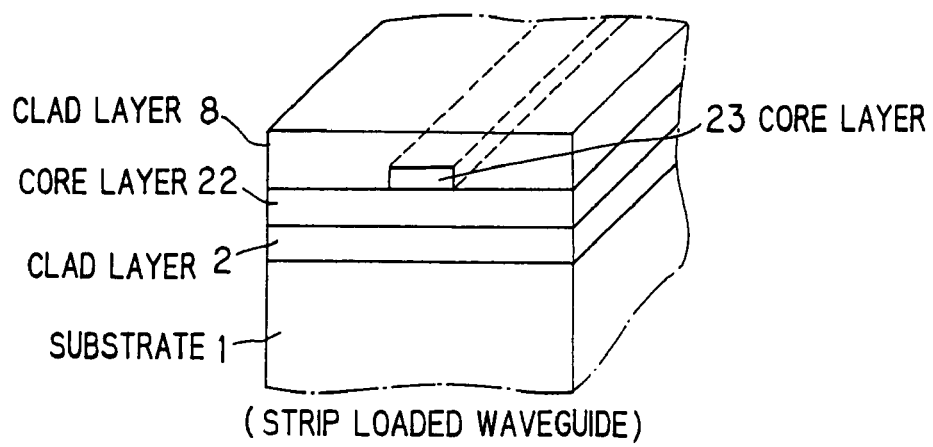
FIG. 4 is an explanatory diagram illustrating a cross-sectional structure of a strip loaded waveguide.
Figure 5:
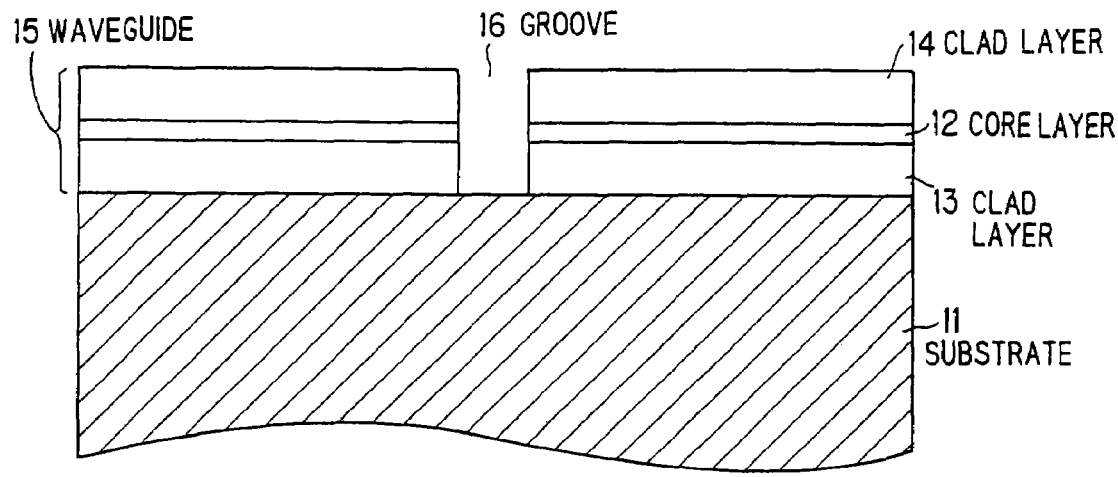
FIG. 5 is a cross-sectional view illustrating a prior-art proposed 1st step of changing a processing technique according to hardness of an optical waveguide device.
Figure 6:
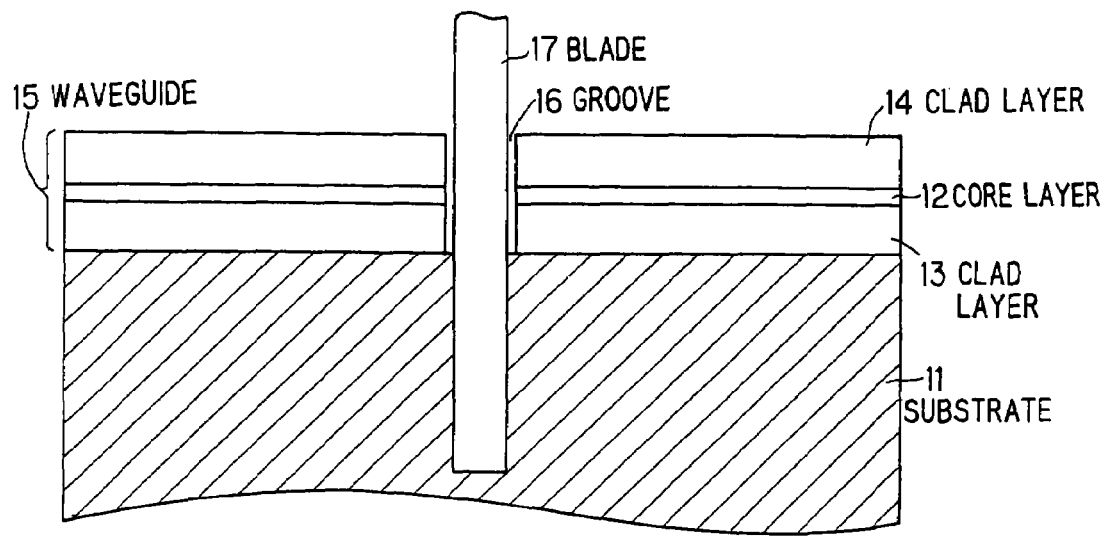
FIG. 6 is a cross-sectional view illustrating a 2nd step of the proposal shown in FIG. 5.
Figure 19:
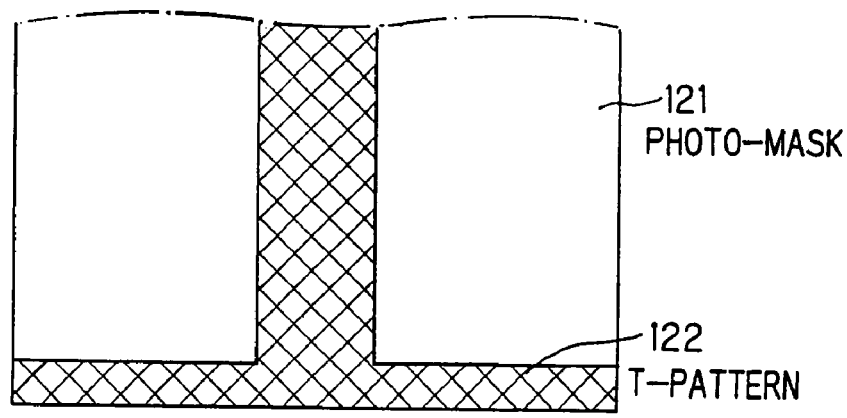
FIG. 19 is a top view of an essential portion illustrating a pattern of a photo-mask used in the present embodiment.

FIG. 19 corresponds to FIG. 1D, and illustrates a pattern of a photo-mask used for etching core layer 113 illustrated in FIG. 18. Photo-mask 121 of this embodiment is in T-shaped pattern 122 where a portion to remain as the core shields ultraviolet light. Photo-mask 121 is disposed on a photoresist (not illustrated) applied to core layer 113 illustrated in FIG. 18, and is irradiated with ultraviolet light. Thereafter, the photoresist is developed, and remains on core layer 113 in the same pattern as T-shaped pattern 122. This is processed with a chemical to etch and remove a portion of core layer 113 where the photoresist is absent.

Figure 20:
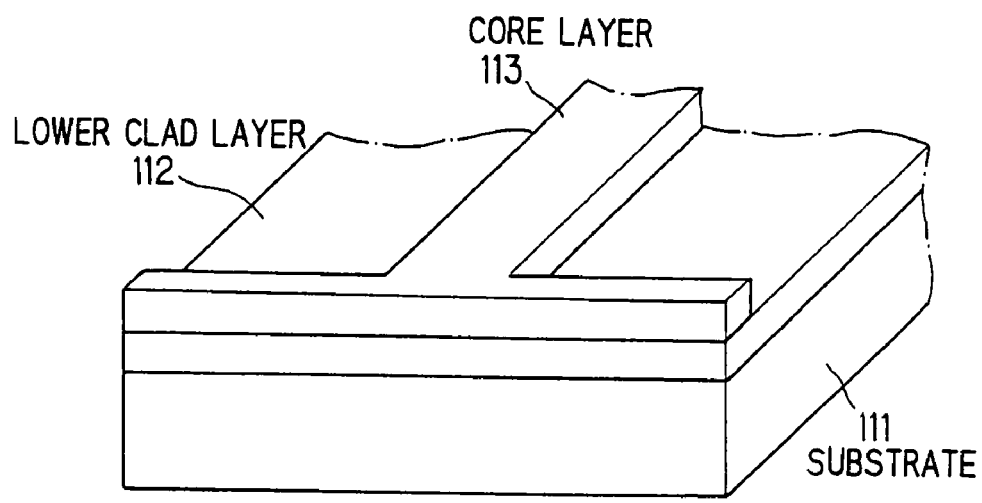
FIG. 20 is a perspective view of an essential portion of the optical waveguide device illustrating a state subsequent to etching of the core layer illustrated in FIG. 19 in the present embodiment.

FIG. 20 illustrates a halfway production process of an optical waveguide device thus formed with T-shaped core layer 113. This is further coated with an upper cladding 185 to provide optical waveguide device 101 as illustrated in FIG. 13. The height of each portion of T-shaped core layer 113 illustrated in FIG. 20 is the same. Accordingly, in the stage of coating the upper cladding, protruding strip-shaped waveguide 103 and wall 106 have exactly the same height as illustrated in FIG. 13. Thus, in the case where optical waveguide device 101 is cut along the cutting line indicated with broken line 105 by reactive ion etching, no unevenness exists in this cut portion, and no deformation occurs in the end face during cutting. Likewise, in the case of the cutting of optical waveguide device 101 by a dicing saw, no chipping occurs in the end face, and the cut end face does not deform.

Now, in optical waveguide device 101 of this embodiment, subsequent to cutting, a portion of wall 106 is left with waveguide 103 joined thereto as illustrated in FIG. 15. Because this residual wall 106 may cause an optical loss increase in optical waveguide device 101, this is examined.

Figure 21:
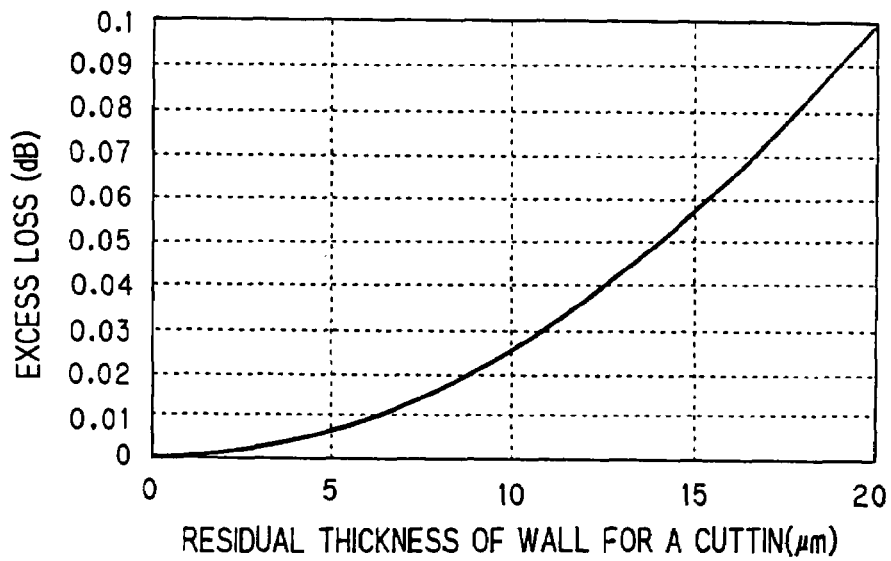
FIG. 21 is a characteristics graph showing a relationship between residual thickness of a wall to be cut and excess loss due thereto.

FIG. 21 shows a relationship between residual thickness (μm) of wall 106 to be cut and excess loss (dB) due thereto. If the residual wall 106 is, say, 5 μm, the loss increase is no more than 0.01 dB from the characteristics graph shown in FIG. 21. Thus, wall 106 has substantially no effect on the optical characteristics. Therefore, in optical waveguide device 101 of this embodiment, deformation of the end face can be suppressed without any sacrifice in the optical characteristics.

Figure 22:
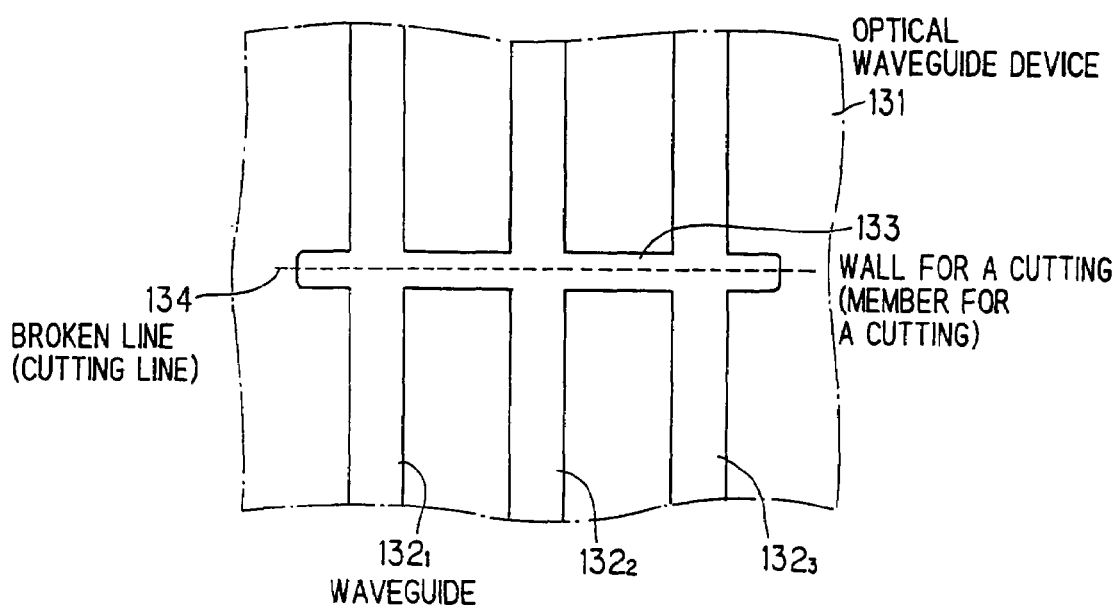
FIG. 22 is a top view of an essential portion illustrating a state prior to cutting of an optical waveguide device as the first modified example of the present invention.

FIG. 22 illustrates an essential portion of an optical waveguide device as the first modified example of the present invention. In this modified example, a plurality of protruding strip-shaped waveguides $132_1$-$132_3$ are spaced parallel to each other on top of optical waveguide device 131. Also, a protruding strip-shaped member 133 to be cut is disposed to perpendicularly cross these waveguides $132_1$-$132_3$. Each waveguide $132_1$-$132_3$ and member 133 are formed in the same manner as the above embodiment by etching-processing the same core layer into a desired pattern and forming a cladding thereon. Thus, member 133 has the same height at any position and is flat.

In the case of the first modified example, member 133 is cut in the middle portion as indicated with broken line 134, for example, by reactive ion etching, so that the device can be divided into two optical waveguide devices. Since member 133 has the flat surface, no deformation occurs in the cut surface of the end of each waveguide $132_1$-$132_3$. Accordingly, a fiber array not illustrated may be disposed opposite cut member 133, thereby enabling satisfactory optical coupling.

Figure 23:
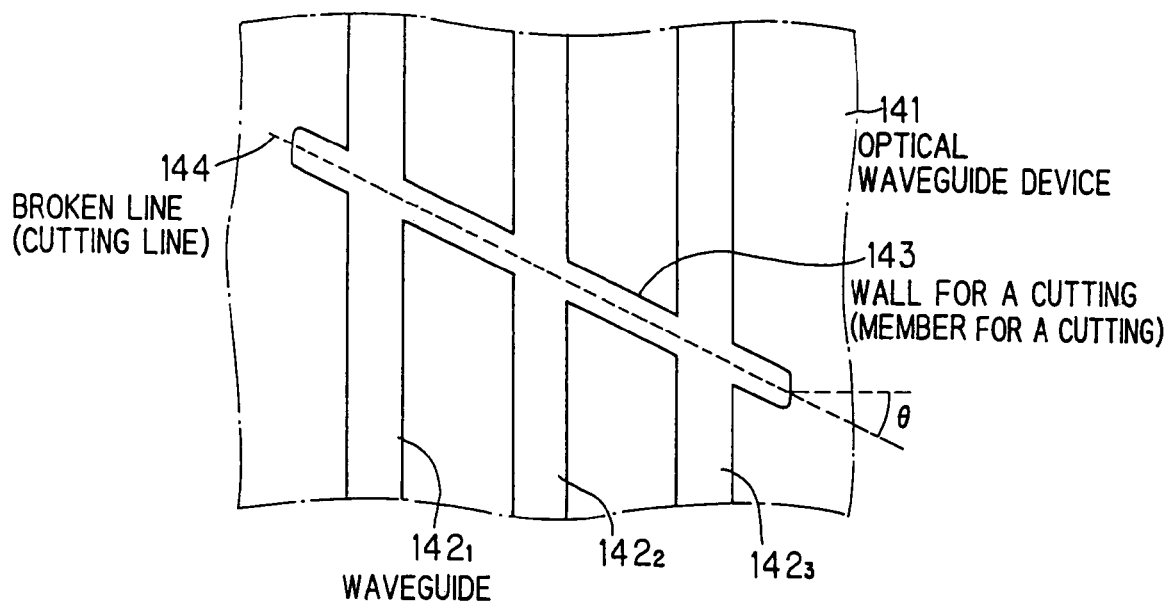
FIG. 23 is a top view of an essential portion illustrating a state prior to cutting of an optical waveguide device as the second modified example of the present invention.

FIG. 23 illustrates a state prior to cutting of an optical waveguide device in the second modified example of the present invention. Even in optical waveguide device 141 of this modified example, a plurality of protruding strip-shaped waveguides $142_1$-$142_3$ are spaced parallel to each other on top of optical waveguide device 141. But, protruding strip-shaped member 143 to be cut is not perpendicular to the longitudinal direction of these waveguides $142_1$-$142_3$, and is inclined at angle θ to its transverse direction, where angle θ is 80°-100°.

Even in the second modified example, each waveguide $142_1$-$142_3$ and member 143 are formed in the same manner as the above embodiment by etching-processing the same core layer into a desired pattern and forming a cladding thereon. Thus, member 143 has the same height at any position and is flat. When member 143 is cut in the middle portion as indicated with broken line 144, for example, by reactive ion etching, no deformation occurs in the cut surface. Furthermore, the second modified example can solve the problem of light returning to an incident side by reflection at the cut end face of each waveguide $142_1$-$142_3$.

Figure 24:
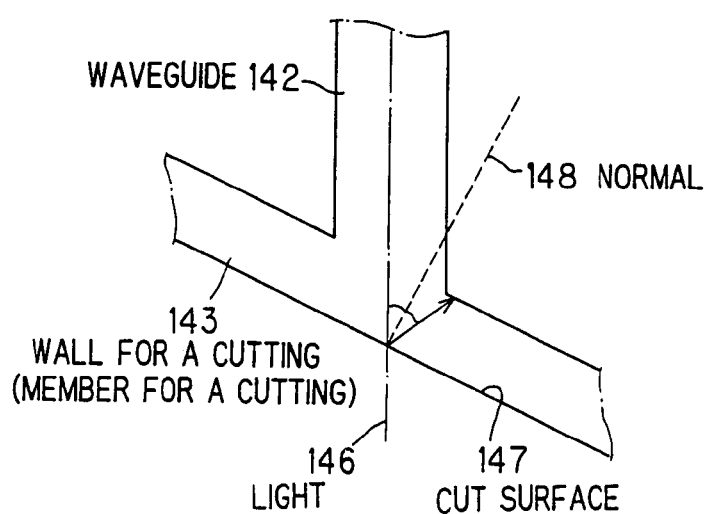
FIG. 24 is an explanatory diagram illustrating a manner of light transmission and reflection in the optical waveguide device subsequent to cutting in the second modified example.

FIG. 24 illustrates a principle of avoiding an effect of return light. Light 146 progressing from waveguide 142 in the direction of member 143 is transmitted through cut surface 147 of the core at broken line 144 of FIG. 23, while partially reflected in the direction indicated by the arrow in FIG. 24. This reflected light does not return to waveguide 142, and is reflected, propagated and attenuated inside member 143.

Figure 25:
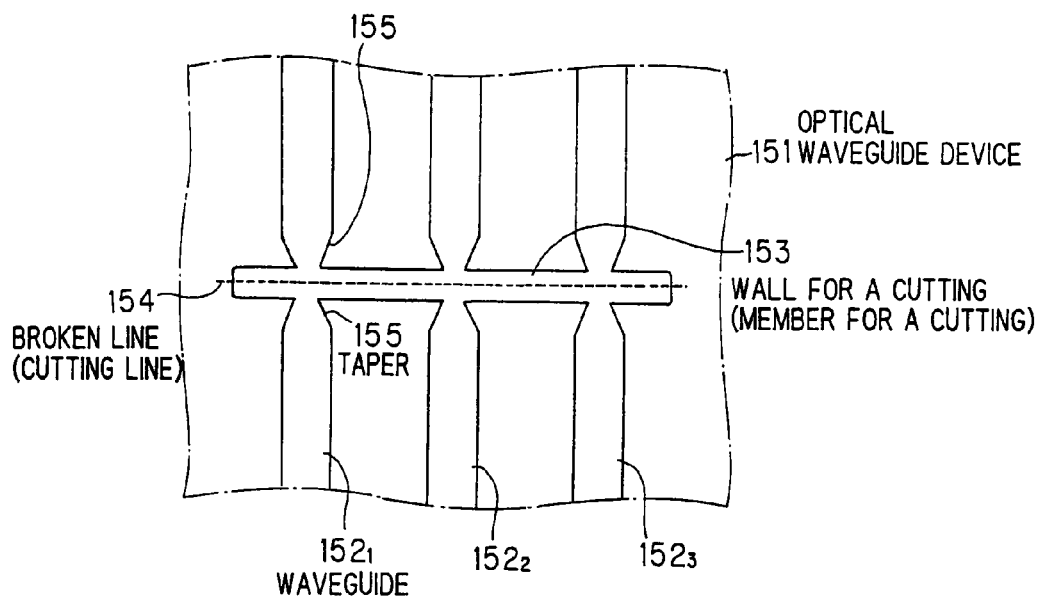
FIG. 25 is a top view of an essential portion illustrating a state prior to cutting of an optical waveguide device in the third modified example of the present invention.

FIG. 25 illustrates a state prior to cutting of an optical waveguide device in the third modified example of the present invention. Even in optical waveguide device 151 of the third modified example, each waveguide $152_1$-$152_3$ and member 153 to be cut are formed in the same manner as the above embodiment by etching-processing the same core layer into a desired pattern and forming a cladding thereon. Thus, member 153 has the same height at any position and is flat. When member 153 is cut in the middle portion as indicated with broken line 154, for example, by reactive ion etching, no deformation occurs in the cut surface.

Furthermore, in the case of the third modified example, each waveguide $152_1$-$152_3$ has taper 155 narrower at the tip in contact with member 153. Accordingly, an optical component such as a fiber array not illustrated may be disposed opposite the cut surface indicated with broken line 154, thereby enabling satisfactory optical coupling via member 153, although depends upon the shape of taper 155.

Figure 26:
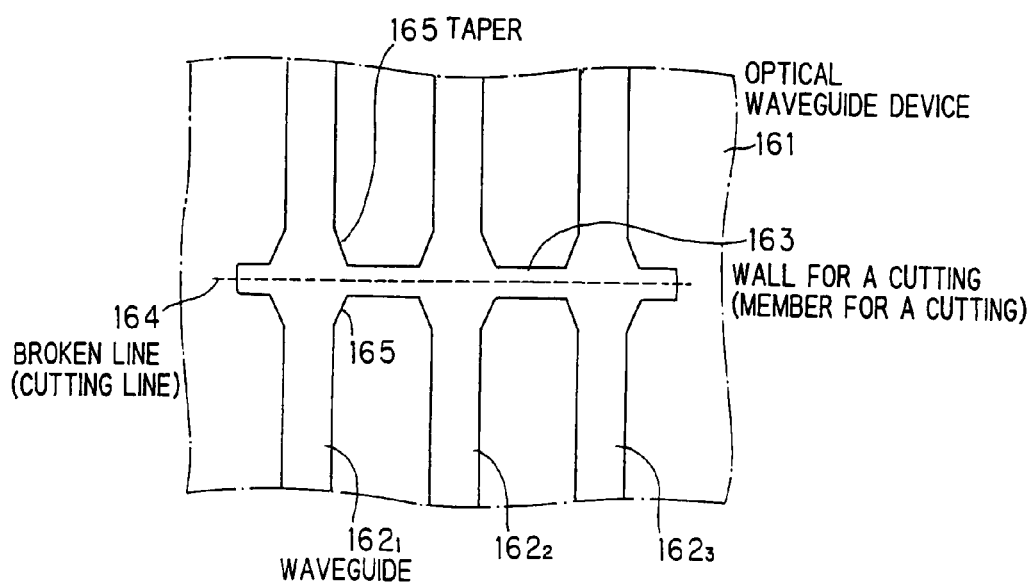
FIG. 26 is a top view of an essential portion illustrating a state prior to cutting of an optical waveguide device in the fourth modified example of the present invention.

FIG. 26 illustrates a state prior to cutting of an optical waveguide device in the fourth modified example of the present invention. Even in optical waveguide device 161 of the fourth modified example, each waveguide $162_1$-$162_3$ and member 163 to be cut are formed in the same manner as the above embodiment by etching-processing the same core layer into a desired pattern and forming a cladding thereon. Thus, member 163 has the same height at any position and is flat. When member 163 is cut in the middle portion as indicated with broken line 164, for example, by reactive ion etching, no deformation occurs in the cut surface.

Furthermore, in the case of the fourth modified example, each waveguide $162_1$-$162_3$ has taper 165 wider at the tip in contact with member 163. Accordingly, an optical component such as a fiber array not illustrated may be disposed opposite the cut surface indicated with broken line 164, thereby enabling satisfactory optical coupling via member 163 although depends upon the shape of taper 165.

Also, although in these modified examples, the tip of each waveguide $152_1$-$152_3$ and $162_1$-$162_3$ is in the taper shape, it may be in the exponential or quadric shape, or combination thereof.

Figure 27:
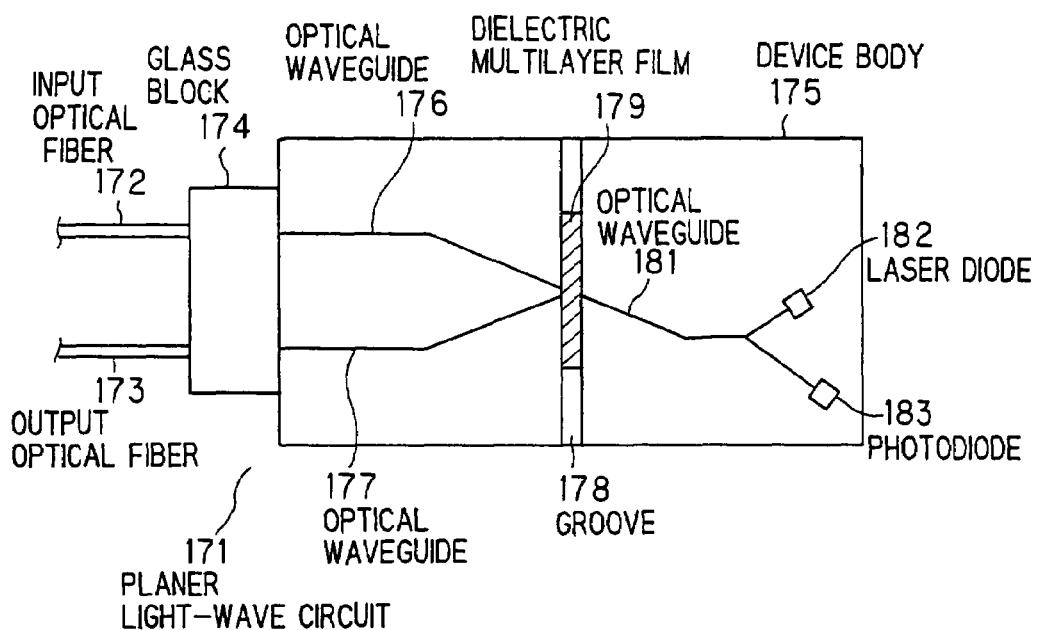
FIG. 27 is a cross-sectional view illustrating a planer lightwave circuit cut horizontally at a specified height from the substrate as an optical waveguide device in the fifth modified example of the present invention.

FIG. 27 illustrates a planer light-wave circuit cut horizontally at a specified height from the substrate as an optical waveguide device in the fifth modified example of the present invention. In planer light-wave circuit 171, single mode input optical fiber 172 and output optical fiber 173 are optically-coaxially connected by glass block 174 for fixation to respective first and second optical waveguides 176 and 177 formed on device body 175. Groove 178 is provided near a converging point of first and second optical waveguides 176 and 177, and dielectric multilayer film 179 is inserted in groove 178 as a filter, and fixed by an adhesive. Third optical waveguide 181 formed opposite first and second optical waveguides 176 and 177 is in the same optical axis as first optical waveguide 176. Dielectric multilayer film 179 reflects 1.55 μm light, and transmits 1.3 μm light. Third optical waveguide 181 forks on the way, and laser diode 182 is disposed at one end of the fork, while photodiode 183 disposed at the other end.

In such planer light-wave circuit 171, 1.3 μm and 1.55 μm multiwavelength light from single mode input optical fiber 172 enters first input/output optical waveguide 176. 1.55 μm light is reflected at dielectric multilayer film 179 and output from second optical waveguide 177 to output optical fiber 173. 1.3 μm light is transmitted through dielectric multilayer film 179, divided into two at the fork of third optical waveguide 181, and coupled to photodiode 183. Also, laser diode 182 is disposed at the other end of the fork. Such planer light-wave circuit 171 is disclosed in Japanese unexamined patent publication No. 2001-249247, for example.

Figure 28:
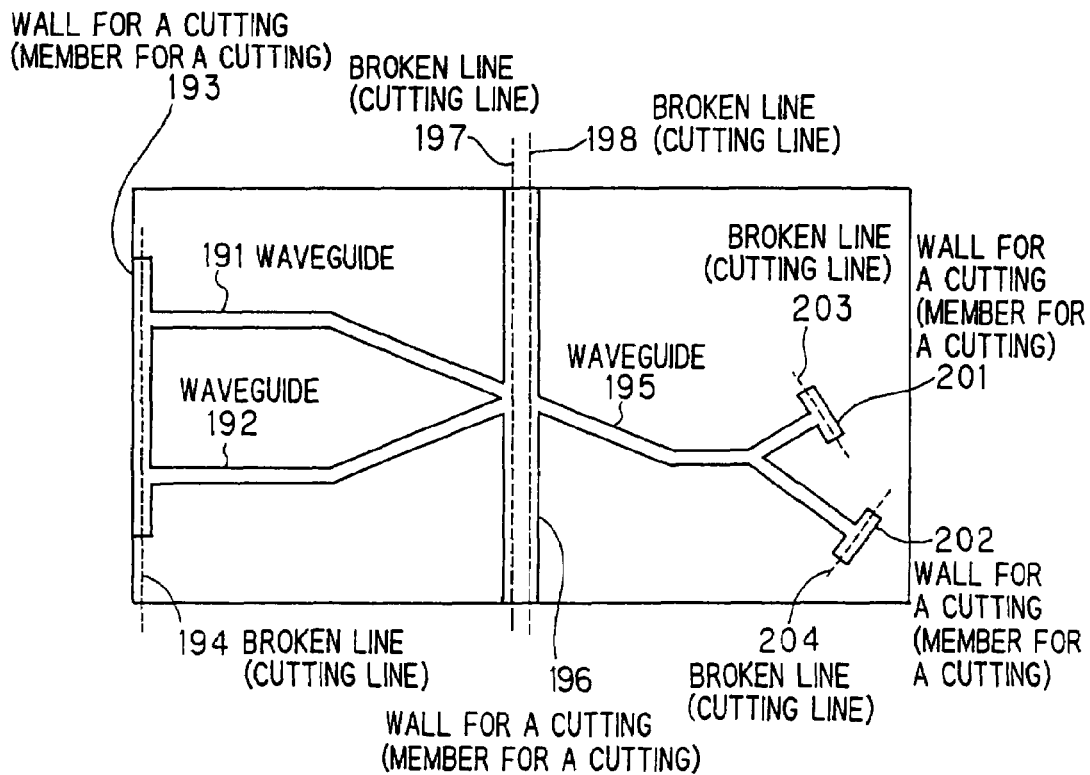
FIG. 28 is a top view illustrating a pattern of the core prior to cutting of the optical waveguide device illustrated in FIG. 27.

FIG. 28 illustrates a pattern of the core prior to the cutting of the optical waveguide device illustrated in FIG. 27. At the left end of FIG. 28 of each protruding strip-shaped waveguide 191 and 192 corresponding to first and second optical waveguides 176 and 177 of FIG. 27 is formed wall 193 with the same height as them to be cut. Wall 193 is cut along broken line 194 by a dicing saw and then ground to be joined to glass block 174 illustrated in FIG. 27.

Also, slightly thick wall 196 to be cut is formed on the converging side of waveguides 191 and 192 in such a manner as to sandwich the end of waveguide 195 corresponding to third optical waveguide 181 of FIG. 27. Wall 196 to be cut has the same height as each waveguide 191, 192 and 195. Wall 196 is cut along two parallel broken lines 197 and 198 by reactive ion etching or a dicing saw. Likewise, walls 201 and 202 to be cut are provided at positions where laser diode 182 and photodiode 183 are embedded respectively, and walls 201 and 202 are cut along broken lines 203 and 204 respectively.

Further, although the core and the member to be cut, formed of the same material as the core, have the same height in the above embodiment and modified examples, the member or portion to be cut only has to be even i.e. flat in the cutting direction. Therefore, the top surface of the wall to be cut does not have to be the same in height in every portion, but may be uniformly inclined in the cutting direction, or in the direction perpendicular thereto provided that light progression is not particularly affected. Also, although the cutting of the portion protruding from the periphery has been examined in the above embodiment and modified examples, the present invention may likewise be applied to cutting of a portion recessed from the periphery.

Also, although the optical coupling between the cut wall and another component has been briefly explained in the fifth modified example, examples other than this will hereinafter be shown.

Figure 29A:
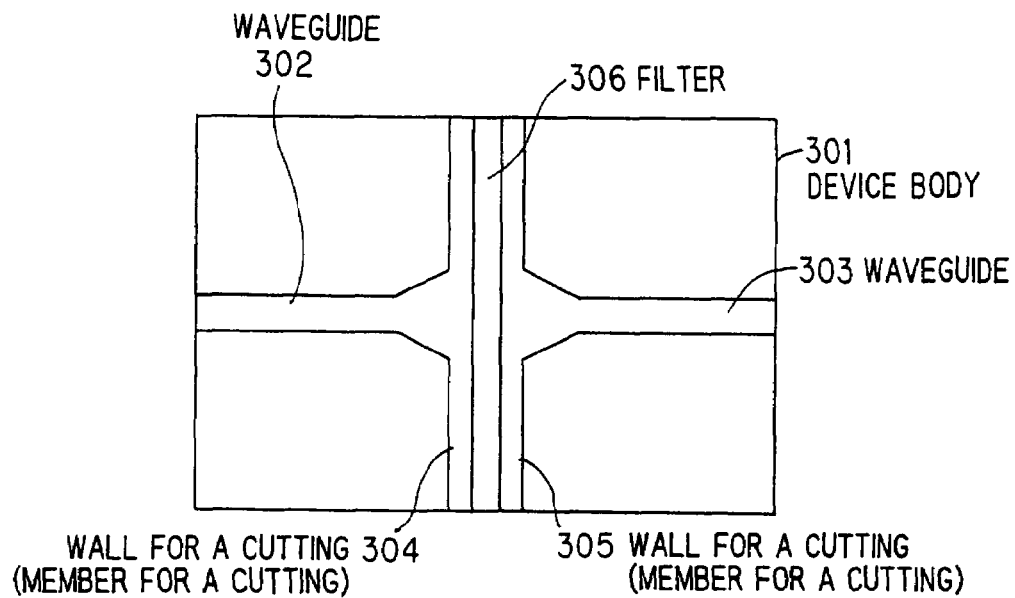
FIGS. 29A and 29B are top and side views of an optical waveguide device illustrating an example of interposing a filter in a cut wall subsequent to cutting of two waveguides.
Figure 29B:
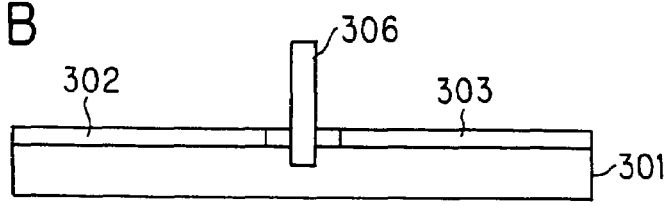

FIGS. 29A and 29B are top and side views of an optical waveguide device illustrating an example of interposing a filter in a cut wall subsequent to cutting of two waveguides. Cut walls 304 and 305 connected to a pair of waveguides 302 and 303 formed on device body 301 are formed by cutting a wall at a specified width and depth with a dicing saw. In a groove produced by this is interposed filter 306.

Figure 30A:
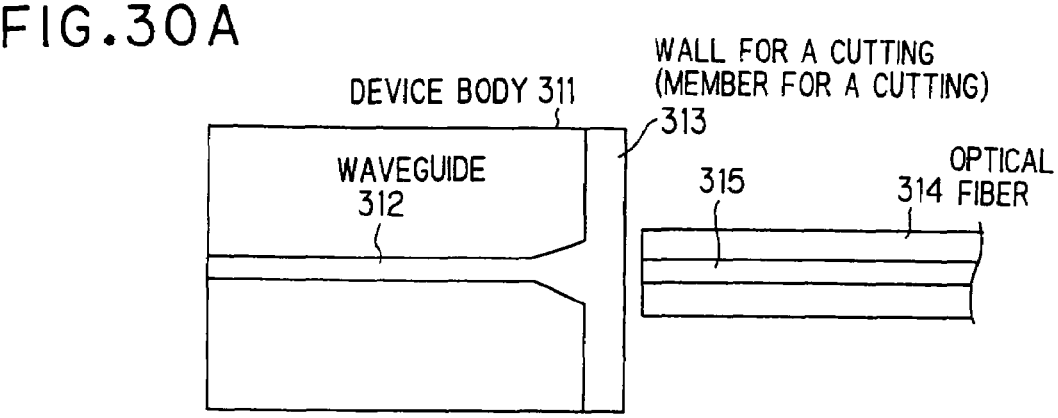
FIGS. 30A and 30B are top and side views of an optical waveguide device illustrating an example of arranging an end face of an optical fiber opposite a cut wall subsequent to cutting of a waveguide.
Figure 30B:
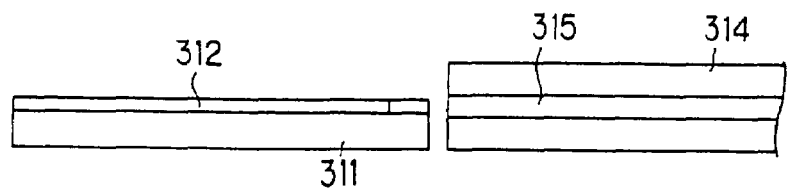

FIGS. 30A and 30B are top and side views of an optical waveguide device illustrating an example of arranging an end face of an optical fiber opposite a cut wall subsequent to cutting of a waveguide. A portion of cut wall 313 corresponding to the core of waveguide 312 formed on device body 311 is disposed opposite core tip 315 of optical fiber 314, thereby optically coupling both.

Figure 31A:
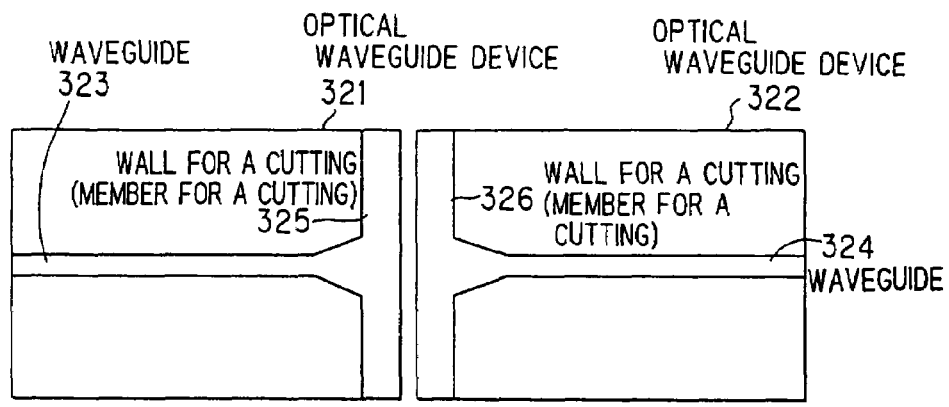
FIGS. 31A and 31B are top and side views of two optical waveguide devices illustrating an example of optical coupling of the two optical waveguide devices by arranging their cut walls directly opposite each other.
Figure 31B:
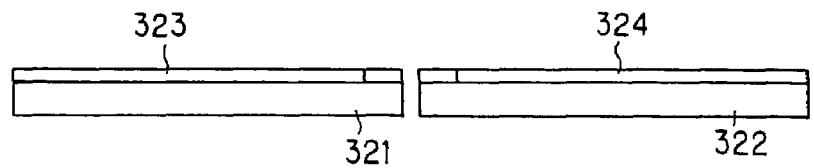

FIGS. 31A and 31B are top and side views of two optical waveguide devices illustrating an example of optical coupling of the two optical waveguide devices by arranging their cut walls directly opposite each other. In this example, cut walls 325 and 326 connected to waveguides 323 and 324 of two optical waveguide devices 321 and 322 are disposed opposite each other so that their respective core positions are matched to each other. Although it is illustrated that optical waveguide devices 321 and 322 has one respective waveguide 323 and 324, a plurality of optical waveguides may be provided for each optical waveguide device 321 and 322, in which case these optical waveguides are optically coupled at the same time.

Figure 32A:
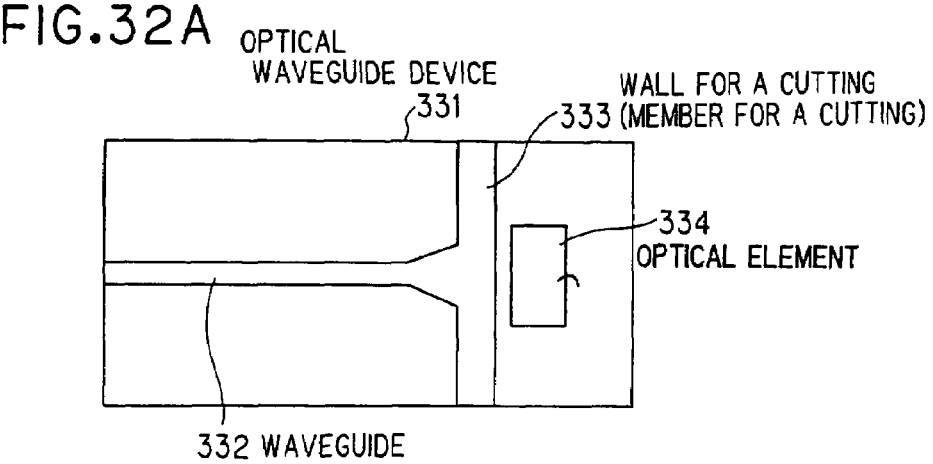
FIGS. 32A and 32B are top and side views of an optical waveguide device illustrating an example of optical coupling of the optical waveguide device and an optical device such as a light emitting/receiving device.
Figure 32B:
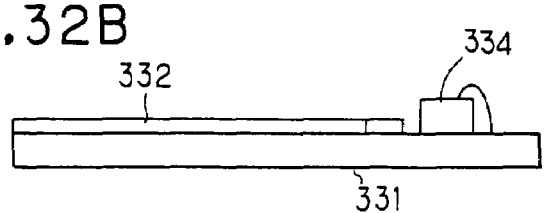

FIGS. 32A and 32B are top and side views of an optical waveguide device illustrating an example of optical coupling of the optical waveguide device and an optical device such as a light emitting/receiving device. Cut wall 333 connected to waveguide 332 of optical waveguide device 331 is optically coupled to optical device 334 disposed directly on the same substrate.

Figure 33A:
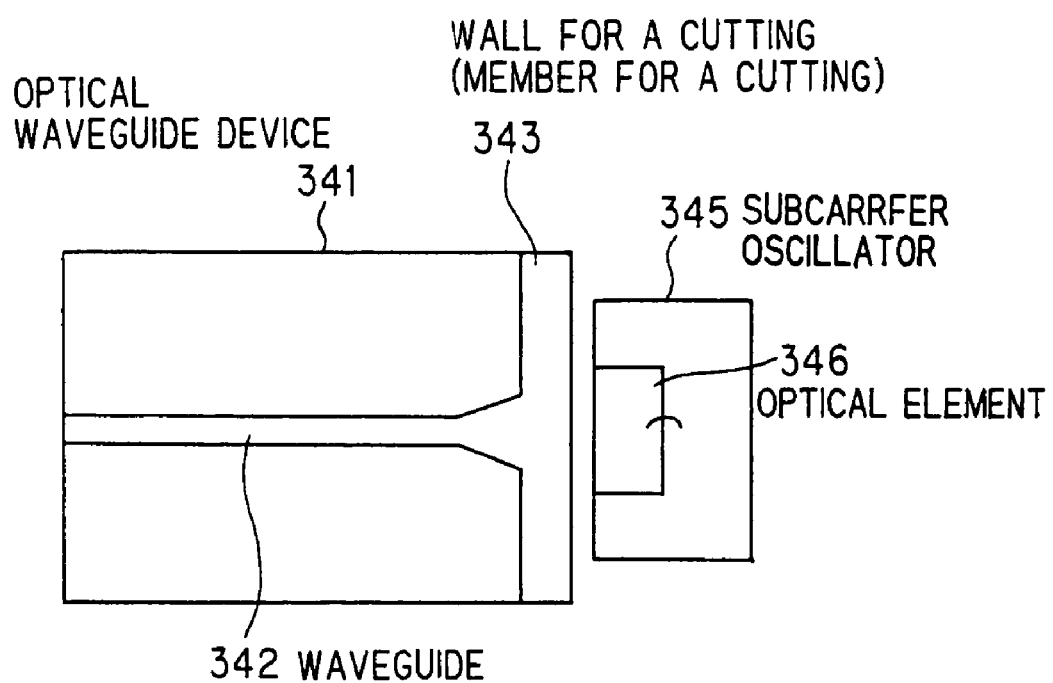
FIGS. 33A and 33B are top and side views of an optical waveguide device illustrating another example of optical coupling of the optical waveguide device and an optical device such as a light emitting/receiving device.
Figure 33B:
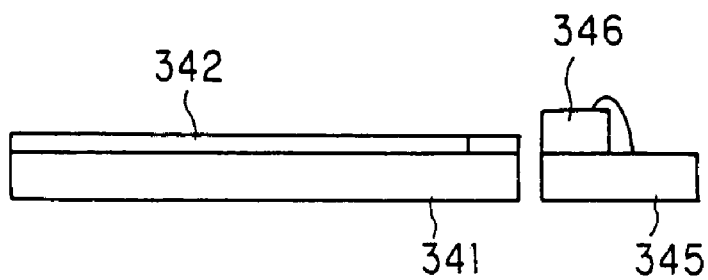

FIGS. 33A and 33B are top and side views of an optical waveguide device illustrating another example of optical coupling of the optical waveguide device and an optical device such as a light emitting/receiving device. In this example, cut wall 343 connected to waveguide 342 of optical waveguide device 341 is optically coupled to optical device 346 disposed directly on subcarrier oscillator 345.

Also, an example of arranging an optical device such as a light emitting/receiving device in a recess of a substrate is illustrated in the fifth modified example. Thus, the optical waveguide device of the present invention can employ each kind of form of optical coupling.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. An optical waveguide device, comprising:
   a core for propagating light, said core formed on a substrate; and
   a unitary member having a predetermined width, and having a cut in its lengthwise direction, said member being connected with said core at a predetermined angle, and a height of said member being constant and equal to a height of said core at a position where said member is connected with said core, said cut extending though said substrate.

2. An optical waveguide device, according to claim 1, wherein said core is the same in material as said member.

3. An optical waveguide device, according to claim 2, wherein said core is fabricated to integrate with said member at a common fabricating step.

4. An optical waveguide device, according to claim 3, wherein said core and said member are covered with a cladding.

5. An optical waveguide device, according to claim 3, wherein said core and said member are covered at least on a side of a substrate with a cladding.

6. An optical waveguide device, according to claim 1, wherein said core and said member are formed on a core layer which is the same in material as said core.

7. An optical waveguide device, according to claim 1, wherein said member is arranged to cross said core at an angle of 90°.

8. An optical waveguide device, according to claim 1, wherein said member is arranged to cross said core at an angle of 80° to 100°.

9. An optical waveguide device, comprising:
   a core for propagating light; and
   a unitary member having a predetermined width to be cut in its lengthwise direction, said member being connected with said core at a predetermined angle, and a height of said member being constant at a position where said member is connected with said core,
   wherein said core includes a plurality of cores which are arranged in parallel with a predetermined interval; and said member is connected in common with said plurality of cores.

10. An optical waveguide device. comprising:
    a core for propagating light, said core formed on a substrate: and a unitary member having a predetermined width, and having a cut in its lengthwise direction, said member being connected with said core at a predetermined angle, and a height of said member being constant at a position where said member is connected with said core, said cut extending though said substrate,
    wherein said core is of a tapered shape at an end portion thereof, with which said member is in contact.

11. An optical waveguide device, according to claim 10, wherein said tapered shape of said core has an outward taper toward said member.

12. An optical waveguide device, according to claim 10, wherein said tapered shape of said core has an inward taper toward said member.

13. A method of fabricating an optical waveguide device, comprising the steps of:

forming a cladding on a substrate;

forming a core layer of a flat plate shape on said cladding;

removing said core layer in a predetermined shape at a predetermined depth to provide a member having a predetermined width to be cut in its lengthwise direction, said member being connected with a core for propagating light at a predetermined angle to provide a T-shaped pattern, and a height of said member being constant at a position where said member is connected with said core, while said predetermined shape excluding said core and said member; and cutting said member in a direction parallel to said lengthwise direction.

14. A method of fabricating an optical waveguide device, according to claim 13, wherein said cutting step is carried out to cut said member by means of reactive ion etching.

15. A method of fabricating an optical waveguide device, according to claim 13, wherein said cutting step is carried out to cut said member by use of a dicing saw.

16. A method of fabricating an optical waveguide device, comprising the steps of:

forming a cladding on a substrate;

forming a first core layer of a flat plate shape on said cladding;

forming a second core layer on said first core layer;

removing said second core layer in a predetermined shape at a predetermined depth to provide a member having a predetermined width to be cut in its lengthwise direction, said member being connected with a core for propagating light at a predetermined angle to provide a T-shaped pattern, and a height of said member being constant at a position where said member is connected with said core, while said predetermined shape excluding said core and said member; and cutting said member in a direction parallel to said lengthwise direction.

17. A method of fabricating an optical waveguide device, according to claim 16, wherein said cutting step is carried out to cut said member by means of reactive ion.

18. A method of fabricating an optical waveguide device, according to claim 16, wherein said cutting step is carried out to cut said member by use of a dicing saw.

* * * * *